T. D. POWERS.
SHAFT-COUPLING.

No. 184,021. Patented Nov. 7, 1876.

Witnesses
P. Koung
V. Hendry

Inventor:
Thomas D. Powers.

UNITED STATES PATENT OFFICE.

THOMAS D. POWERS, OF HOLLAND, MICHIGAN.

IMPROVEMENT IN SHAFT-COUPLINGS.

Specification forming part of Letters Patent No. 184,021, dated November 7, 1876; application filed July 31, 1876.

*To all whom it may concern:*

Be it known that I, THOMAS D. POWERS, of Holland, in the county of Ottawa, in the State of Michigan, have invented a new and useful Improvement in Lock-Joints or Couplers; and I do declare that the following is a full, clear, and exact description of the same, reference being had to the annexed drawings, making a part of this specification, in which—

Figure 1:
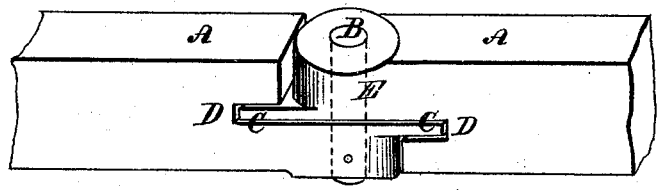
Figure 2:
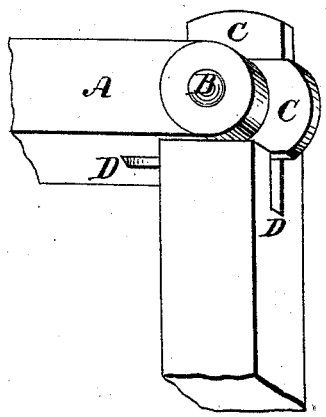
Figure 3:
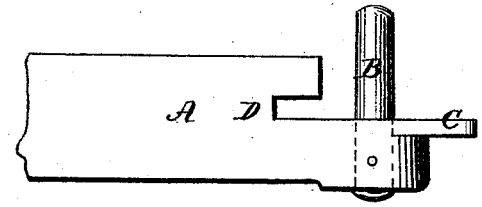
Figure 4:
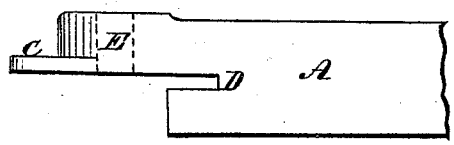

Figure 1 is a perspective view when attached; Fig. 2, a perspective view, showing how to attach. Fig. 3 shows the male part of joint, with bolt. Fig. 4 shows the female part of joint, with eye.

The nature of my invention consists in attaching two parts together in a joint without rivets or loose bolts, nuts, screws, or keys, in such a manner as to hold them firmly in place while in use, admitting of all necessary motion, and detaching them in a moment, when at a certain angle with each other.

Fig. 1, letter A, represents the parts to be joined together; B, the fixed bolt; C, the tongue; D, the slot; E, the eye through which the bolt passes. The dotted lines show the position of bolt, and also the closed end of slot.

To enable others skilled in the art to make and use my invention, I will proceed to describe its construction and operation.

I construct the parts to be joined nearly alike, with a slot and tongue in each, which will fit into each other when joined. I make an eye in each at right angles with the slots, to one of which is welded a bolt. (See Figs. 3 and 4.) I then place the two parts one against the other at right angles, as shown in Fig. 2, press them together, and turn them so that the tongues slip into the slots. This locks them together, forming a joint, and they can be detached again in a moment when at a proper angle, which angle may vary, if necessary.

What I claim as my invention, and desire to secure by Letters Patent, is—

A shaft-coupler having the tongues, slots, and fixed bolts, as set forth and shown.

THOMAS D. POWERS. [L. S.]

Witnesses:
P. KONING,
V. HENDRY.